(12) United States Patent
Liu et al.

(10) Patent No.: US 9,684,503 B2
(45) Date of Patent: Jun. 20, 2017

(54) ELECTRONIC DEVICE AND METHOD FOR SAVING POWER IN THE ELECTRONIC DEVICE

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Young-Way Liu, New Taipei (TW); Chih-San Chiang, New Taipei (TW); Hua-Dong Cheng, Shenzhen (CN); Nan Yu, Shenzhen (CN); Ling-Juan Jiang, Shenzhen (CN); Shuang Hu, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 30 days.

(21) Appl. No.: 14/715,125

(22) Filed: May 18, 2015

(65) Prior Publication Data
US 2016/0187957 A1    Jun. 30, 2016

(30) Foreign Application Priority Data
Dec. 24, 2014   (CN) .......................... 2014 1 0817670

(51) Int. Cl.
| G06F 1/00 | (2006.01) |
| G06F 1/26 | (2006.01) |
| G06F 1/32 | (2006.01) |
| G06F 9/445 | (2006.01) |
| H04W 52/02 | (2009.01) |
| H04M 1/725 | (2006.01) |

(52) U.S. Cl.
CPC ................ *G06F 8/62* (2013.01); *G06F 1/324* (2013.01); *G06F 1/3206* (2013.01); *G06F 1/3212* (2013.01); *G06F 1/3225* (2013.01); *G06F 1/3265* (2013.01); *G06F 1/3275* (2013.01); *G06F 1/3287* (2013.01); *H04W 52/0277* (2013.01); *G06F 1/26* (2013.01); *H04M 1/72569* (2013.01)

(58) Field of Classification Search
CPC ..................................... G06F 1/32; G06F 1/26
See application file for complete search history.

(56) References Cited

U.S. PATENT DOCUMENTS

| 8,429,097 B1 * | 4/2013 | Sivasubramanian ......................... G06F 17/30483 706/12 |
| 2008/0066162 A1 * | 3/2008 | Saito ...................... G06F 21/608 726/4 |

(Continued)

FOREIGN PATENT DOCUMENTS

| CN | 104021065 A | 9/2014 |
| TW | 200745836 A | 12/2007 |

*Primary Examiner* — Phil Nguyen
(74) *Attorney, Agent, or Firm* — Steven Reiss

(57) ABSTRACT

A method for saving power of an electronic device includes establishing relationship between operational states and operations carried out by the electronic device. According to the relationship, an operation to the electronic device is executed after acquiring current operational states of the electronic device periodically. And the operational states of the electronic device is refreshed after executing the operation to the electronic device.

17 Claims, 5 Drawing Sheets

(56) References Cited

U.S. PATENT DOCUMENTS

| | | | |
|---|---|---|---|
| 2008/0200220 A1* | 8/2008 | Jackson | G06F 1/3203 455/574 |
| 2010/0205472 A1* | 8/2010 | Tupman | G06F 1/3203 713/340 |
| 2012/0130660 A1* | 5/2012 | Neumeyer | G01R 31/3679 702/63 |
| 2013/0024442 A1* | 1/2013 | Santosuosso | G06F 17/30424 707/720 |
| 2013/0031353 A1* | 1/2013 | Noro | G06F 1/3212 713/100 |
| 2013/0103960 A1* | 4/2013 | Alberth | G06F 1/3212 713/320 |
| 2014/0025971 A1* | 1/2014 | Yuan | G06F 1/32 713/320 |
| 2014/0033207 A1* | 1/2014 | Sharma | G06F 11/3072 718/100 |
| 2014/0215366 A1* | 7/2014 | Ryu | G06F 11/3438 715/765 |
| 2015/0153810 A1* | 6/2015 | Sasidharan | G06F 1/3212 713/320 |

\* cited by examiner

| Remaining capacity ranges of a battery | Power saving mode | Operations |
|---|---|---|
| A first predetermined value (e.g. 20 percent of full power) | M1 | Cleaning up memory when the display is locked for five minutes, decreasing brightness of the display to 50 percent of full brightness. |
| A second predetermined value (e.g. 15 percent of full power) | M2 | Turning off notification tone and vibration, turning off network connection, decreasing the brightness of the display to 30 percent of full brightness. |
| A third predetermined value (e.g. 10 percent of full power) | M3 | Turning off global position system, decreasing the brightness of the display to 20 percent of full brightness. |
| A fourth predetermined value (e.g. 5 percent of full power) | M4 | Decreasing the brightness of the display to 10 percent of full brightness. |

FIG. 4

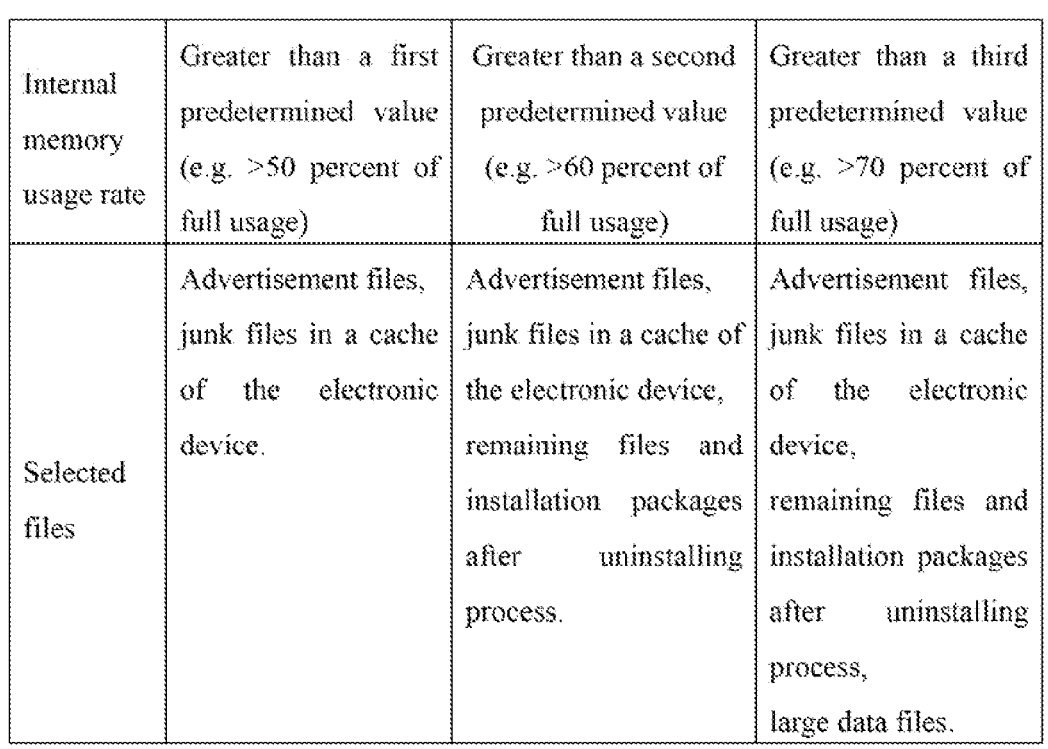

| Internal memory usage rate | Greater than a first predetermined value (e.g. >50 percent of full usage) | Greater than a second predetermined value (e.g. >60 percent of full usage) | Greater than a third predetermined value (e.g. >70 percent of full usage) |
|---|---|---|---|
| Selected files | Advertisement files, junk files in a cache of the electronic device. | Advertisement files, junk files in a cache of the electronic device, remaining files and installation packages after uninstalling process. | Advertisement files, junk files in a cache of the electronic device, remaining files and installation packages after uninstalling process, large data files. |

FIG. 5

ELECTRONIC DEVICE AND METHOD FOR SAVING POWER IN THE ELECTRONIC DEVICE

CROSS-REFERENCE TO RELATED APPLICATIONS

This application claims priority to Chinese Patent Application No. 201410817670.2 filed on Dec. 24, 2014, the contents of which are incorporated by reference herein.

FIELD

The subject matter herein generally relates to the field of power efficiency techniques, and particularly to automatically save power of an electronic device.

BACKGROUND

Electronic devices, such as mobile phones, are increasingly equipped with more and more functions. As a result, power of a battery of the electronic device is consumed more quickly, a user of the electronic device must close some functions manually.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

FIG. 4 is a diagrammatic view of one embodiment of a relationship between a remaining power level of a battery and operations in an electronic device.

FIG. 5 is a diagrammatic view of one embodiment of a relationship between an internal memory usage rate range and selected files.

DETAILED DESCRIPTION

Figure 1:
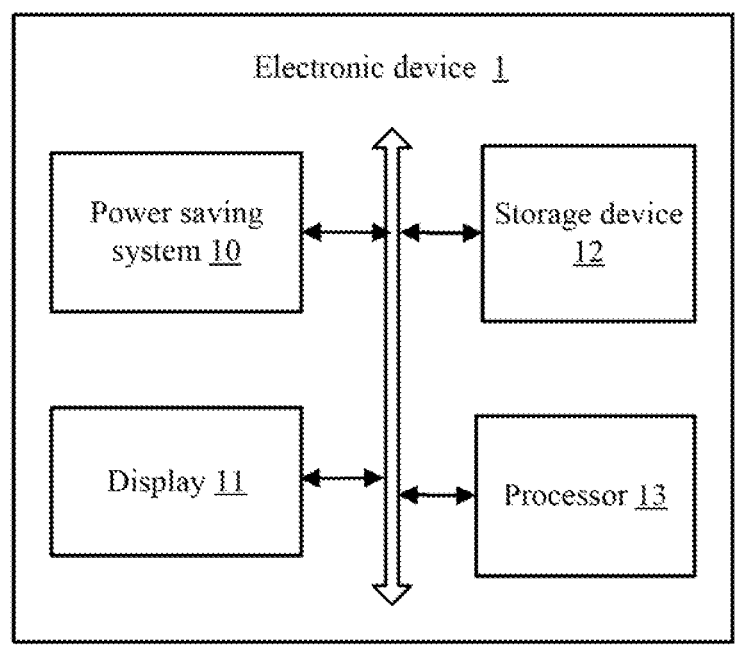
FIG. 1 is a block diagram of an example embodiment of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. It should be noted that references to "an" or "one" embodiment in this disclosure are not necessarily to the same embodiment, and such references mean "at least one."

The term "module", as used herein, refers to logic embodied in hardware or firmware, or to a collection of software instructions, written in a programming language, such as, Java, C, or assembly. The term "comprising," when utilized, means "including, but not necessarily limited to", it specifically indicates open-ended inclusion or membership in the so-described combination, group, series and the like. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY™, flash memory, and hard disk drives.

FIG. 1 is a block diagram of an example embodiment of an electronic device. In at least one embodiment, as shown in FIG. 1, an electronic device 1 can include a power saving system 10. The electronic device 1 can be a smart phone, a personal digital assistant (PDA), a tablet computer, or other electronic device. The electronic device 1 further can include, but is not limited to, a display 11, a storage device 12, and a central processing unit (CPU) 13. FIG. 1 illustrates only one example of the electronic device, other examples can include more or fewer components than as illustrated, or have a different configuration of the various components in other embodiments.

In at least one embodiment, the display 11 can be a light emitting diode (LED) panel, or an organic light emitting diode (OLED) panel. The display 11 can display operational configurations of the electronic device 1.

In at least one embodiment, the storage device 12 can include various types of non-transitory computer-readable storage mediums. For example, the storage device 12 can be an internal storage system, such as a flash memory, a random access memory (RAM) for temporary storage of information, and/or a read-only memory (ROM) for permanent storage of information. The storage device 12 can also be an external storage system, such as a hard disk, a storage card, or a data storage medium. The CPU 13 can be a microprocessor, or other data processor chip that performs functions of the electronic device 1.

The power saving system 10 can establish relationship between operational states of the electronic device 1 and operations to the electronic device 1, and execute one or more configurations or reconfigurations to the electronic device 1 to save power.

Figure 2:
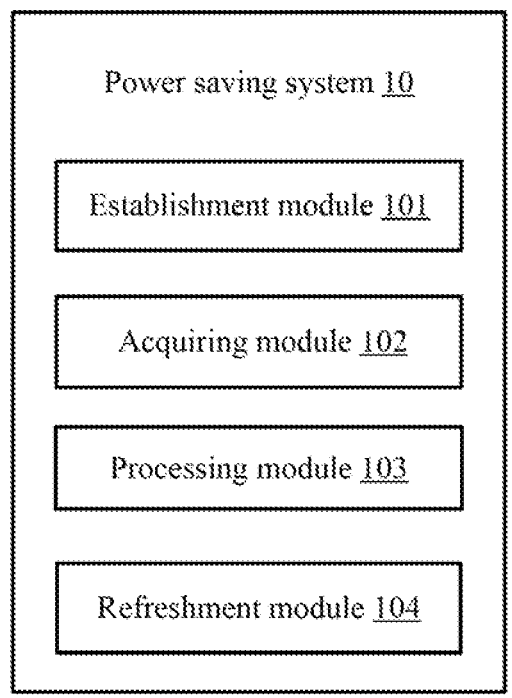
FIG. 2 is block diagram of an example embodiment of function modules of the power saving system in an electronic device.

FIG. 2 is a block diagram of one embodiment of function modules of the power saving system. In at least one embodiment, the power saving system 10 can include an establishment module 101, an acquiring module 102, a processing module 103, and a refreshment module 104. The function modules 101, 102, 103, and 104 can include computerized codes in the form of one or more programs which are stored in the storage device 12. The CPU 13 executes the computerized codes to provide functions of the function modules 101-104.

The establishment module 101 can establish relationship between operational states of the electronic device 1 and operations carried out by the electronic device 1. In at least one embodiment, the operational states includes a remaining power level of a battery of the electronic device 1, a CPU usage rate, an internal memory usage rate, and an internal storage usage rate. The operations carried out by the electronic device 1 can include adjusting a power saving mode of the electronic device 1, adjusting an initial running frequency of the CPU 13, deleting files of the electronic device 1, and uninstalling applications of the electronic device 1.

The acquiring module 102 periodically acquires current operational states of the electronic device 1.

The processing module 103 can execute an operation according to the current operational state and the relationship established by the establishment module 101.

In one embodiment, the processing module 103 can adjust an initial running frequency of the CPU 13 according to the CPU usage rate. When an application is running in the electronic device 1 for the $n^{th}$ time (n is a natural number greater than zero), an initial running frequency of the CPU 13 can be set by a predetermined formula, $f=(\Sigma f_i) \div (n-1)$, $1 \leq i \leq (n-1)$. In the formula, $f_i$ is an average frequency of the CPU 13 when an application is running in the electronic device 1 for the $i^{th}$ time. For example, at the first time of use of the application QQ, an initial running frequency of the CPU 13 can be a default value. At the second time of use of the application QQ, the initial running frequency of the CPU 13 is adjusted to be an average frequency of the running frequencies of the application QQ when used at the first time.

In at least one embodiment, the processing module 103 can execute an operation of adjusting a power saving mode of the electronic device 1 according to a remaining power level of a battery of the electronic device 1. In at least one embodiment, the operations of adjusting a power saving mode of the electronic device 1 includes cleaning up a memory when a display of the electronic device 1 is locked for a predetermined duration, decreasing brightness of the display, and turning off notification tones and vibrating devices, network connections, and a global positioning system of the electronic device 1.

For example, as shown in FIG. 4, an example table 400 is provided by way of example, when the remaining power level is less than a first predetermined value (for example, 20 percent of full power), the power saving mode is adjusted to be M1. In such case, the operations and reconfigurations to the electronic device 1 include cleaning up a memory when the display 11 is locked for five minutes, and decreasing brightness of the display 11 to 50 percent of full brightness. When the remaining power level is less than a second predetermined value (for example, 15 percent of full power), the power saving mode is adjusted to be M2. In such case, the operations and reconfigurations to the electronic device 1 includes turning off notification tones and vibrating devices of the electronic device 1, turning off network connections of the electronic device 1, and decreasing the brightness of the display 11 to 30 percent of full brightness. When the remaining power level is less than a third predetermined value (for example, 10 percent of full power), the power saving mode is adjusted to be M3. In such case, the operations and reconfigurations to the electronic device 1 include turning off GPS of the electronic device 1 and decreasing the brightness of the display 11 to 20 percent of full brightness. When the remaining power level is less than a fourth predetermined value (for example, 10 percent of full power), the power saving mode is adjusted to be M4. In such case, the operations and reconfigurations to the electronic device 1 include decreasing the brightness of the display 11 to 10 percent of full brightness.

In at least one embodiment, the processing module 103 can select one or more files, by reference to an internal memory usage rate, and delete the selected files. For example, as shown in FIG. 5, an example table 500 is provided by way of example, when the internal memory usage rate is greater than a first predetermined value (for example, 50 percent of full usage), the selected files to be deleted can include advertisement files, and junk files in a cache of the electronic device 1. The processing module 103 can delete the adverting and junk files in the cache. When the internal memory usage rate is greater than a second predetermined value (for example, 60 percent of full usage), the selected files to be deleted include the adverting and junk files in a cache of the electronic device 1, and files and installation packages remaining after an uninstalling process. The processing module 103 can delete the adverting and junk files in the cache, and the remaining files and installation packages. When the internal memory usage rate is greater than a third predetermined value (for example, 60 percent of full usage), the selected files to be deleted include the advertising and junk files in a cache of the electronic device 1, remaining files and installation packages after an uninstalling process, and large data files, for example, a video. The processing module 103 can delete the advertising and junk files in the cache, the remaining files and installation packages, and the large data files.

In at least one embodiment, the processing module 103 can select one or more applications according to the internal storage usage rate, and uninstall selected applications. The one or more applications are selected by analyzing a launching frequency and a duration per launch of the application being run in the electronic device 1. For example, the processing module 103 can record a number of times launched and each duration of running an application such as QQ games. When the number of times of launching the application QQ games is one, and the duration of running the launched application QQ games is ten minutes, the selected application can include the QQ games application. When the internal storage usage rate is less than a predetermined value (e.g. 80 percent), the processing module 103 can uninstall the QQ games application.

The refreshment module 104 can refresh the operational parameters and configurations of the electronic device 1 after executing the operation. In at least one embodiment, the refreshment module 104 further can display the refreshed and updated operational parameters and configurations on the display 11.

Figure 3:
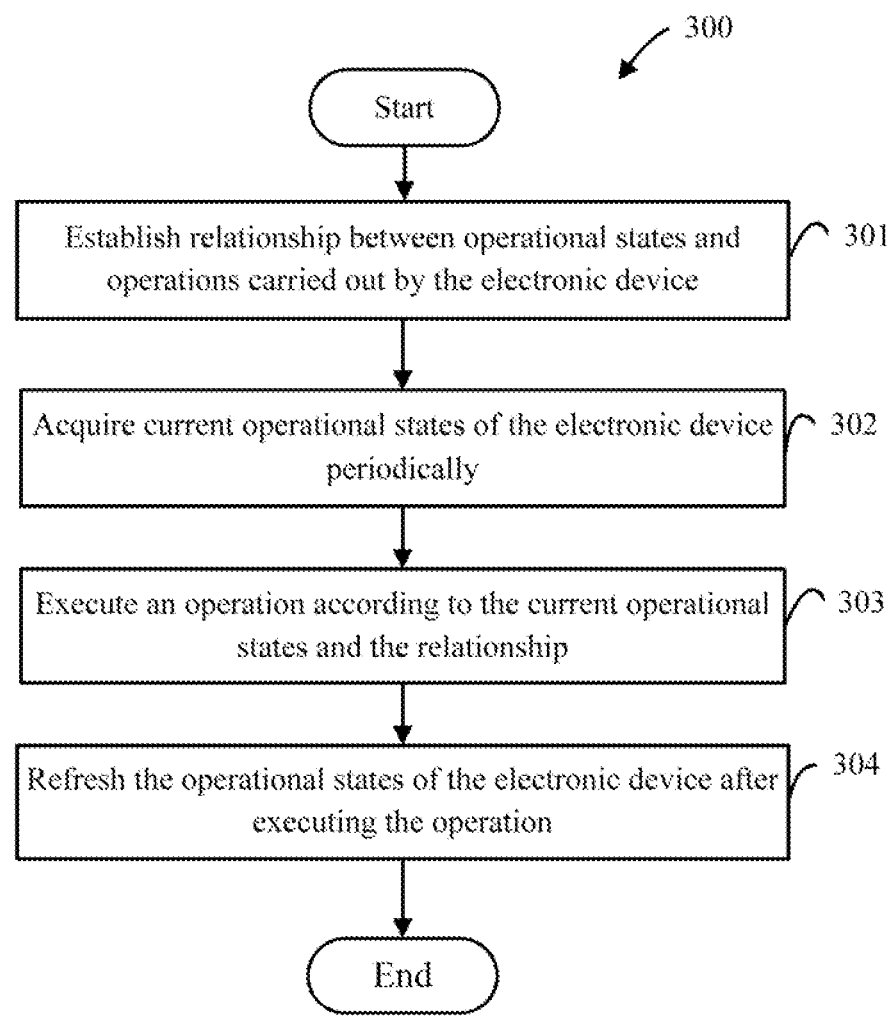
FIG. 3 is a flowchart of an example embodiment of a method for saving power in an electronic device.

FIG. 3 is a flowchart of an example embodiment of a method for controlling the CPU 13 of the electronic device of FIG. 1. An example method 300 is provided by way of example, as there are a variety of ways to carry out the method. The example method 300 described below can be carried out using the configurations illustrated in FIG. 1 and FIG. 2, and various elements of these figures are referenced in explaining the example method. Each block shown in FIG. 3 represents one or more processes, methods, or subroutines, carried out in the example method 300. Furthermore, the illustrated order of blocks is illustrative only and the order of the blocks can be changed according to the present disclosure. The example method 300 can begin at block 301. Depending on the embodiment, additional blocks can be utilized and the ordering of the blocks can be changed.

At block 301, an establishment module can establish relationship between operational states of the electronic device 1 and operations carried out by the electronic device 1. In at least one embodiment, the operational states includes a remaining power level of a battery of the electronic device 1, a CPU usage rate, an internal memory usage rate, and an internal storage usage rate. The operations carried out by the electronic device 1 can include adjusting a power saving mode of the electronic device 1, adjusting an initial running frequency of the CPU 13, deleting files of the electronic device 1, and uninstalling applications of the electronic device 1.

At block 302, an acquiring module periodically acquires current operational states of the electronic device 1.

At block 303, a processing module can execute an operation according to the current operational state and the relationship.

In at least one embodiment, the processing module can adjust an initial running frequency of the CPU 13 according to the CPU usage rate. When an application is running in the electronic device 1 for the $n^{th}$ time (n is a natural number greater than zero), an initial running frequency of the CPU 13 can be set by a predetermined formula, $f=(\Sigma f_i)\div(n-1)$, $1\leq i\leq(n-1)$. In the formula, $f_i$ is an average frequency of the CPU 13 when an application is running in the electronic device 1 for the $i^{th}$ time. For example, at the first time of use of the application QQ, an initial running frequency of the CPU 13 can be a default value. At the second time of use of the application QQ, the initial running frequency of the CPU 13 is adjusted to be an average frequency of the running frequencies of the application QQ when used at the first time.

In at least one embodiment, the processing module can execute an operation of adjusting a power saving mode of the electronic device 1 according to a remaining power level of a battery of the electronic device 1. In at least one embodiment, the operations of adjusting a power saving mode of the electronic device 1 includes cleaning up a memory when a display of the electronic device 1 is locked for a predetermined duration, decreasing brightness of the display, and turning off notification tones and vibrating devices, network connections, and a global positioning system of the electronic device 1.

For example, as shown in FIG. 4, an example table 400 is provided by way of example, when the remaining power level is less than a first predetermined value (for example, 20 percent of full power), the power saving mode is adjusted to be M1. In such case, the operations and reconfigurations to the electronic device 1 include cleaning up a memory when the display 11 is locked for five minutes, and decreasing brightness of the display 11 to 50 percent of full brightness. When the remaining power level is less than a second predetermined value (for example, 15 percent of full power), the power saving mode is adjusted to be M2. In such case, the operations and reconfigurations to the electronic device 1 includes turning off notification tones and vibrating devices of the electronic device 1, turning off network connections of the electronic device 1, and decreasing the brightness of the display 11 to 30 percent of full brightness. When the remaining power level is less than a third predetermined value (for example, 10 percent of full power), the power saving mode is adjusted to be M3. In such case, the operations and reconfigurations to the electronic device 1 include turning off GPS of the electronic device 1 and decreasing the brightness of the display 11 to 20 percent of full brightness. When the remaining power level is less than a fourth predetermined value (for example, 10 percent of full power), the power saving mode is adjusted to be M4. In such case, the operations and reconfigurations to the electronic device 1 include decreasing the brightness of the display 11 to 10 percent of full brightness.

In at least one embodiment, the processing module can select one or more files, by reference to an internal memory usage rate, and delete the selected files. For example, as shown in FIG. 5, an example table 500 is provided by way of example, when the internal memory usage rate is greater than a first predetermined value (for example, 50 percent of full usage), the selected files to be deleted can include advertisement files, and junk files in a cache of the electronic device 1. The processing module can delete the adverting and junk files in the cache. When the internal memory usage rate is greater than a second predetermined value (for example, 60 percent of full usage), the selected files to be deleted include the adverting and junk files in a cache of the electronic device 1, and files and installation packages remaining after an uninstalling process. The processing module can delete the adverting and junk files in the cache, and the remaining files and installation packages. When the internal memory usage rate is greater than a third predetermined value (for example, 60 percent of full usage), the selected files to be deleted include the advertising and junk files in a cache of the electronic device 1, remaining files and installation packages after an uninstalling process, and large data files, for example, a video. The processing module can delete the advertising and junk files in the cache, the remaining files and installation packages, and the large data files.

In at least one embodiment, the processing module can select one or more applications according to the internal storage usage rate, and uninstall selected applications. The one or more applications are selected by analyzing a launching frequency and a duration per launch of the application being run in the electronic device 1. For example, the processing module can record a number of times launched and each duration of running an application such as QQ games. When the number of times of launching the application QQ games is one, and the duration of running the launched application QQ games is ten minutes, the selected application can include the QQ games application. When the internal storage usage rate is less than a predetermined value (e.g. 80 percent), the processing module can uninstall the QQ games application.

At block 304, a refreshment module can refresh the operational parameters and configurations of the electronic device 1 after executing the operation. In at least one embodiment, the refreshment module further can display the refreshed and updated operational parameters and configurations on the display 11.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. An electronic device comprising:
   a central process unit (CPU); and
   a storage device coupled to the CPU storing one or more programs which, when executed by the CPU, cause the CPU to:
   establish a relationship between operational states of the electronic device and operations of the electronic device;

acquire current operational states of the electronic device periodically;

execute an operation according to the current operational states and the relationship; and refresh the operational states of the electronic device after executing the operation, wherein the operational states comprise a CPU usage rate; wherein the operations of the electronic device comprise adjusting an initial running frequency of the CPU according to the CPU usage rate, wherein when an application runs in the electronic device for the $n^{th}$ time, the initial running frequency of the CPU is adjusted according to a predetermined formula, the predetermined formula is $f=(\Sigma f_i)\div(n-1)$, $1\le i\le(n-1)$, $f_i$ representing an average frequency of the CPU when the application is running in the electronic device for the $i^{th}$ time, and n representing a natural number greater than zero.

2. The electronic device according to claim 1, wherein the operational states of the electronic device further comprise a remaining power level of a battery of the electronic device, an internal memory usage rate, and an internal storage usage rate.

3. The electronic device according to claim 1, wherein the operations of the electronic device further comprise adjusting a power saving mode of the electronic device, deleting files of the electronic device, and uninstalling applications of the electronic device.

4. The electronic device according to claim 3, wherein the operations of adjusting the power saving mode of the electronic device comprising:
cleaning up a memory when a display of the electronic device is locked for a predetermined duration; decreasing brightness of the display; and turning off notification tones and vibrating devices, network connections, and a global positioning system of the electronic device.

5. The electronic device according to claim 3, wherein the operations of deleting files of the electronic device comprising:
selecting one or more files according to an internal memory usage rate; and
deleting the selected files.

6. The electronic device according to claim 3, wherein the operations of uninstalling applications of the electronic device comprising:
selecting one or more applications by analyzing a launching frequency and a duration per launch of the application being run in the electronic device; and
uninstalling selected applications according to the internal usage rate.

7. A computer-implemented method for saving power of an electronic device being executed by the CPU of the electronic device, the method comprising:
establishing a relationship between operational states of the electronic device and operations of the electronic device;
acquiring current operational states of the electronic device periodically;
executing an operation according to the current operational states and the relationship; and
refreshing the operational states of the electronic device after executing the operation,
wherein the operational states comprise a CPU usage rate; wherein the operations of the electronic device comprise adjusting an initial running frequency of the CPU according to the CPU usage rate, wherein when an application runs in the electronic device for the $n^{th}$ time, the initial running frequency of the CPU is adjusted according to a predetermined formula, the predetermined formula is $f=(\Sigma f_i)\div(n-1)$, $1\le i\le(n-1)$, $f_i$ representing an average frequency of the CPU when the application is running in the electronic device for the $i^{th}$ time, and n representing a natural number greater than zero.

8. The method according to claim 7, wherein the operational states of the electronic device further comprise a remaining power level of a battery of the electronic device, an internal memory usage rate, and an internal storage usage rate.

9. The method according to claim 7, wherein the operations of the electronic device further comprise adjusting a power saving mode of the electronic device, deleting files of the electronic device, and uninstalling applications of the electronic device.

10. The method according to claim 8, wherein the operations of adjusting the power saving mode of the electronic device comprising: cleaning up a memory when a display of the electronic device is locked for a predetermined duration; decreasing brightness of the display; and turning off notification tones and vibrating devices, network connections, and a global positioning system of the electronic device.

11. The method according to claim 8, wherein the operations of deleting files of the electronic device comprising: selecting one or more files according to an internal memory usage rate; and deleting the selected files.

12. The method according to claim 8, wherein the operations of uninstalling applications of the electronic device comprising: selecting one or more applications by analyzing a launching frequency and a duration per launch of the application being run in the electronic device; and uninstalling the selected applications according to the internal usage rate.

13. A non-transitory storage medium having stored thereon instructions that, when executed by a central process unit (CPU) of an electronic device, causes the CPU to perform a method for saving power of the electronic device, the method comprising:
establishing a relationship between operational states of the electronic device and operations of the electronic device;
acquiring current operational states of the electronic device periodically;
executing an operation according to the current operational states and the relationship; and
refreshing the operational states of the electronic device after executing the operation, wherein the operational states comprise a CPU usage rate; wherein the operations of the electronic device comprise adjusting an initial running frequency of the CPU according to the CPU usage rate,
wherein the operations of the electronic device further comprise adjusting a power saving mode of the electronic device, deleting files of the electronic device, and uninstalling applications of the electronic device;
wherein when an application runs in the electronic device for the $n^{th}$ time, the initial running frequency of the CPU is adjusted according to a predetermined formula, the predetermined formula is $f=(\Sigma f_i)\div(n-1)$, $1\le i\le(n-1)$, $f_i$ representing an average frequency of the CPU when the application is running in the electronic device for the $i^{th}$ time, and n representing a natural number greater than zero.

14. The non-transitory storage medium according to claim 13, wherein the operational states of the electronic device further comprise a remaining power level of a battery of the electronic device, an internal memory usage rate, and an internal storage usage rate.

15. The non-transitory storage medium according to claim 13, wherein the operations of adjusting the power saving mode of the electronic device comprising: cleaning up a memory when a display of the electronic device is locked for a predetermined duration; decreasing brightness of the display; and turning off notification tones and vibrating devices, network connections, and a global positioning system of the electronic device.

16. The non-transitory storage medium according to claim 13, wherein the operations of deleting files of the electronic device comprising: selecting one or more files according to an internal memory usage rate; and deleting the selected files.

17. The non-transitory storage medium according to claim 13, wherein the operations of uninstalling applications of the electronic device comprising: selecting one or more applications by analyzing a launching frequency and a duration per launch of the application being run in the electronic device; and uninstalling the selected applications according to the internal usage rate.

* * * * *